Patented May 24, 1932

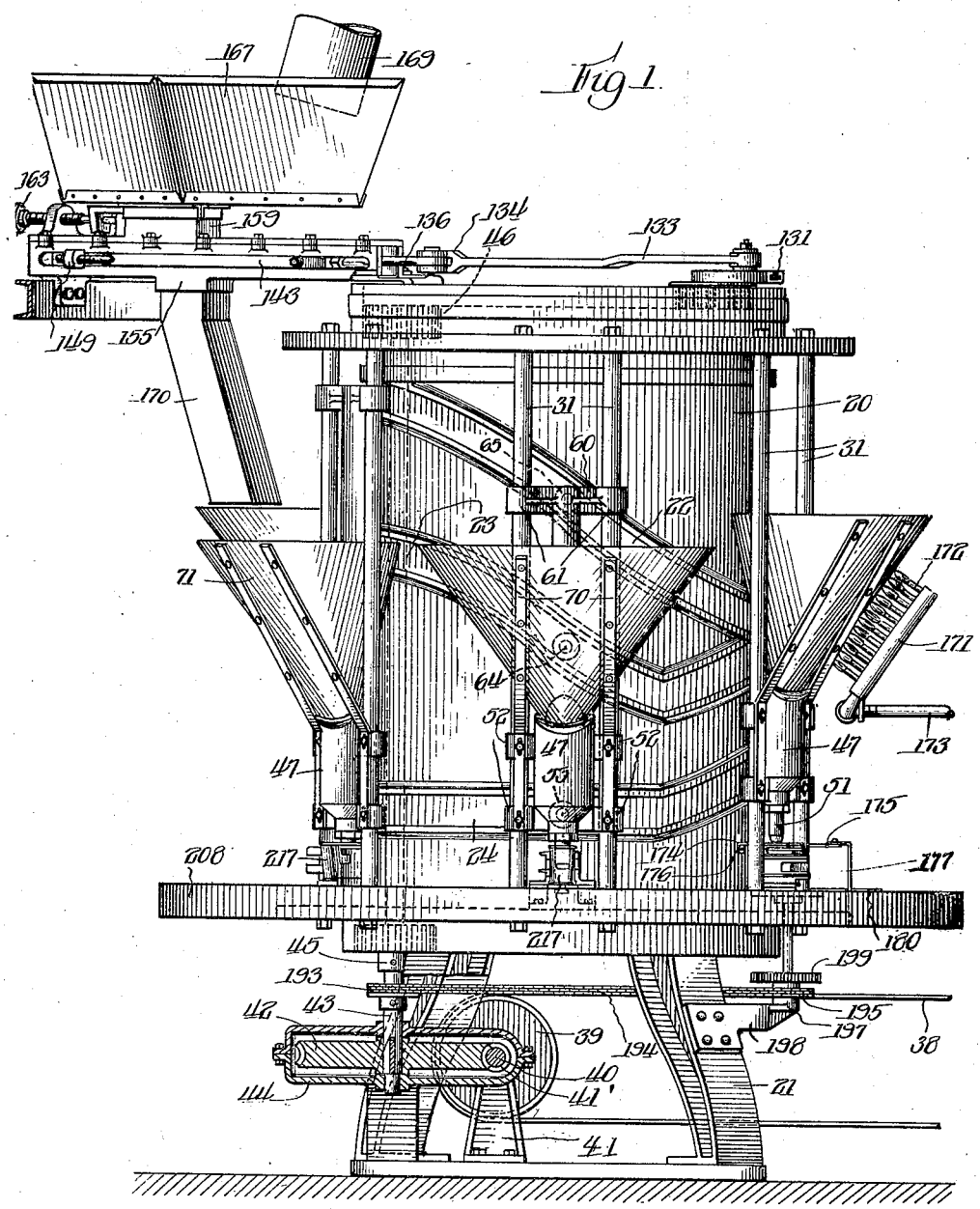

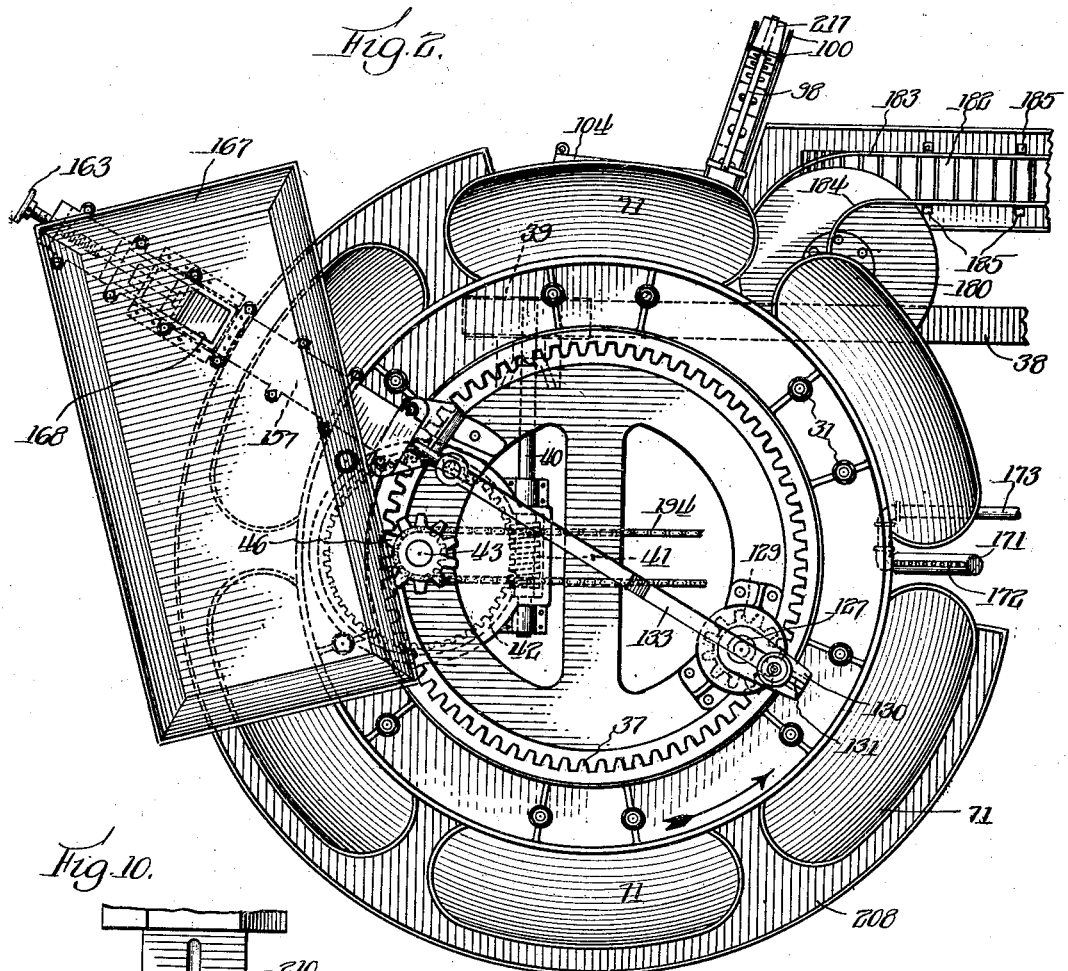
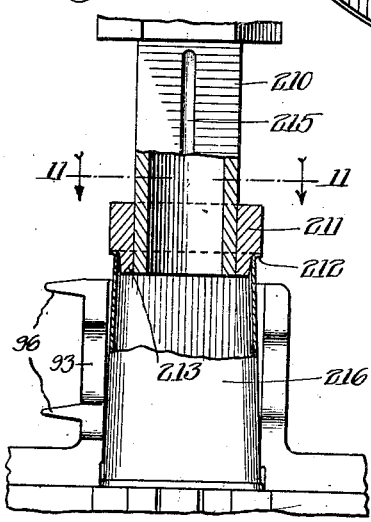
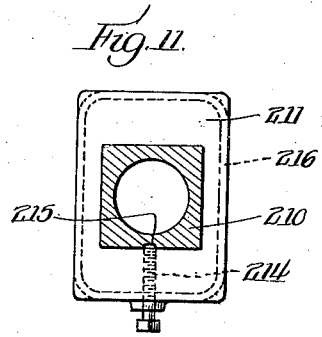

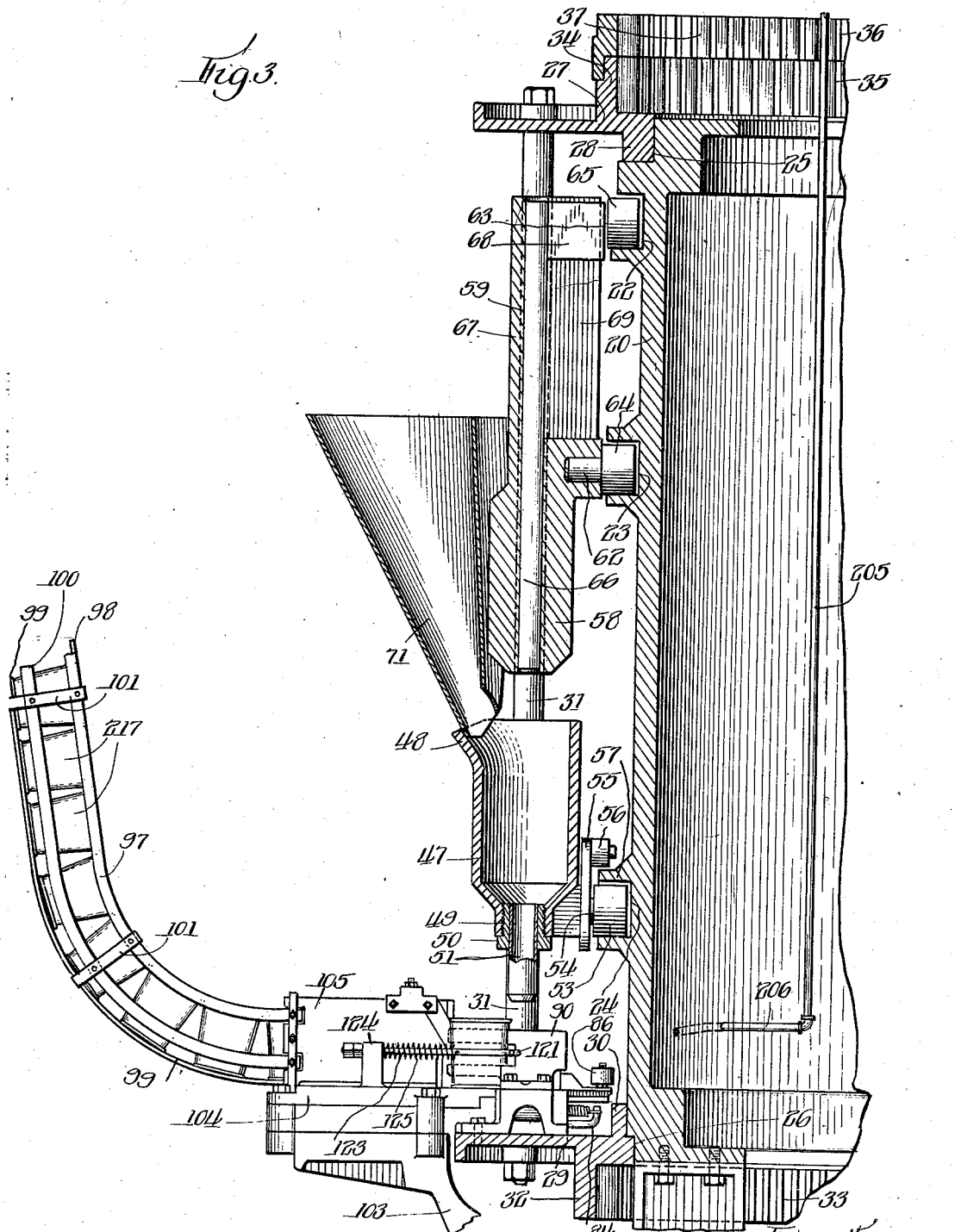

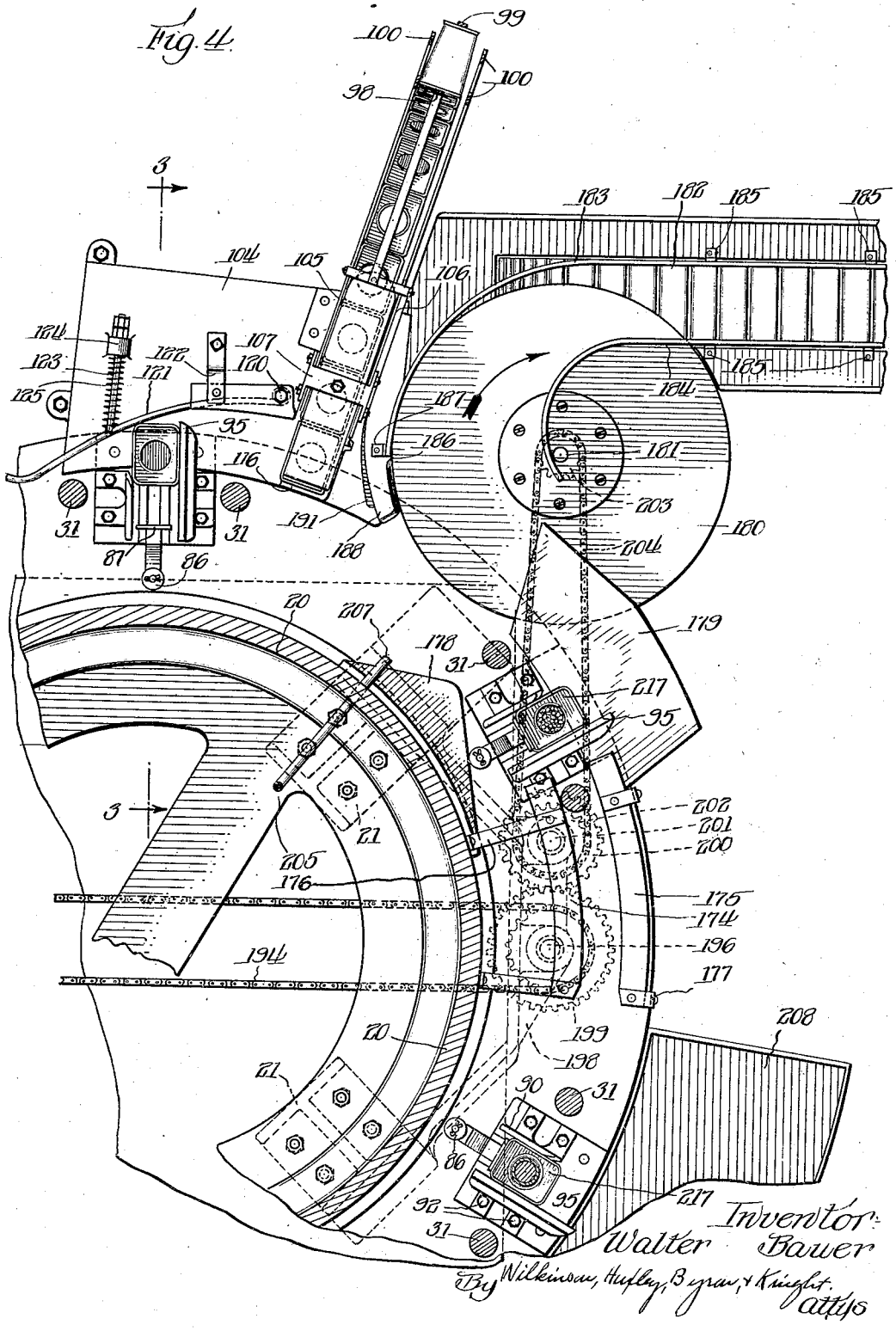

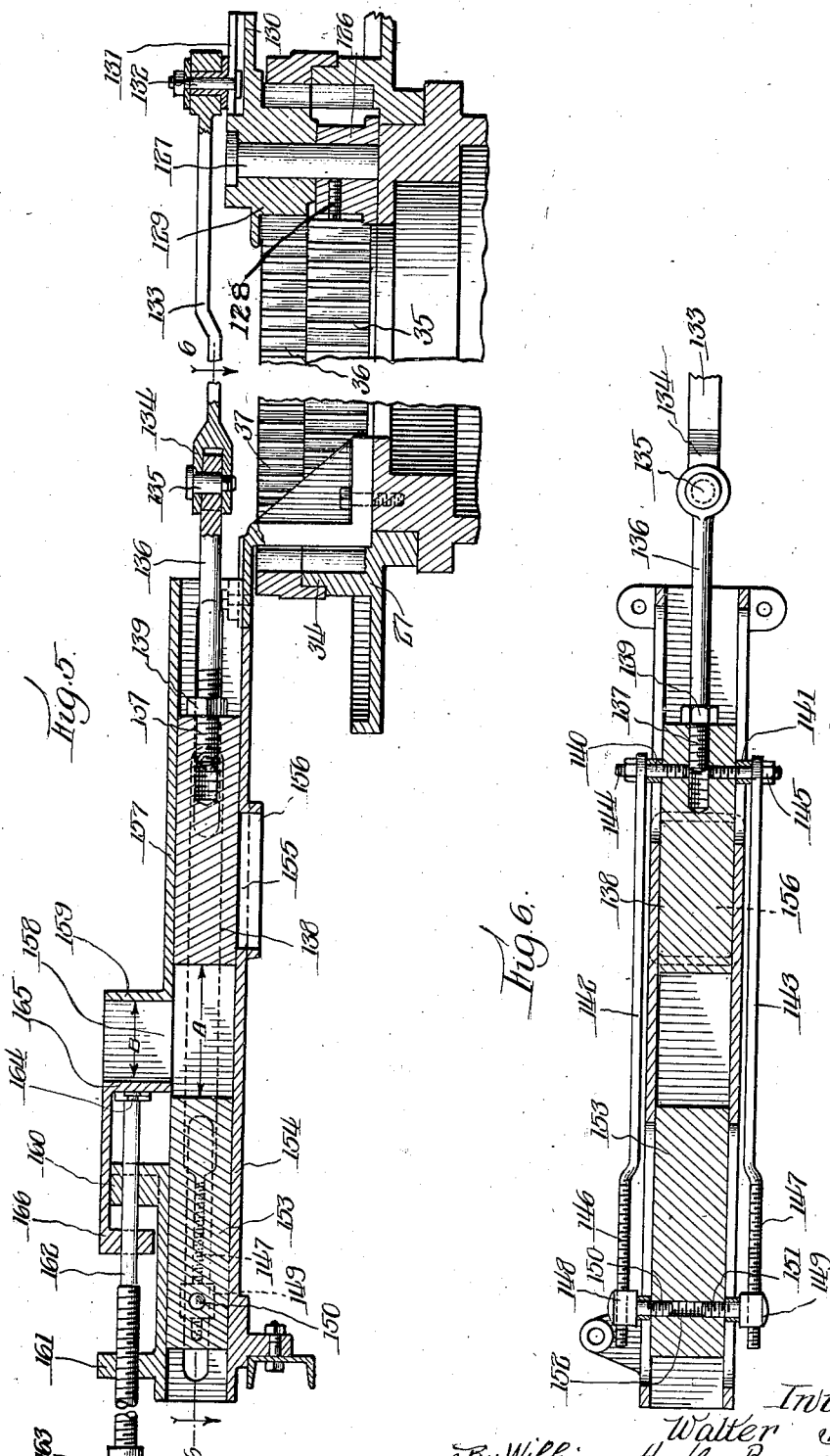

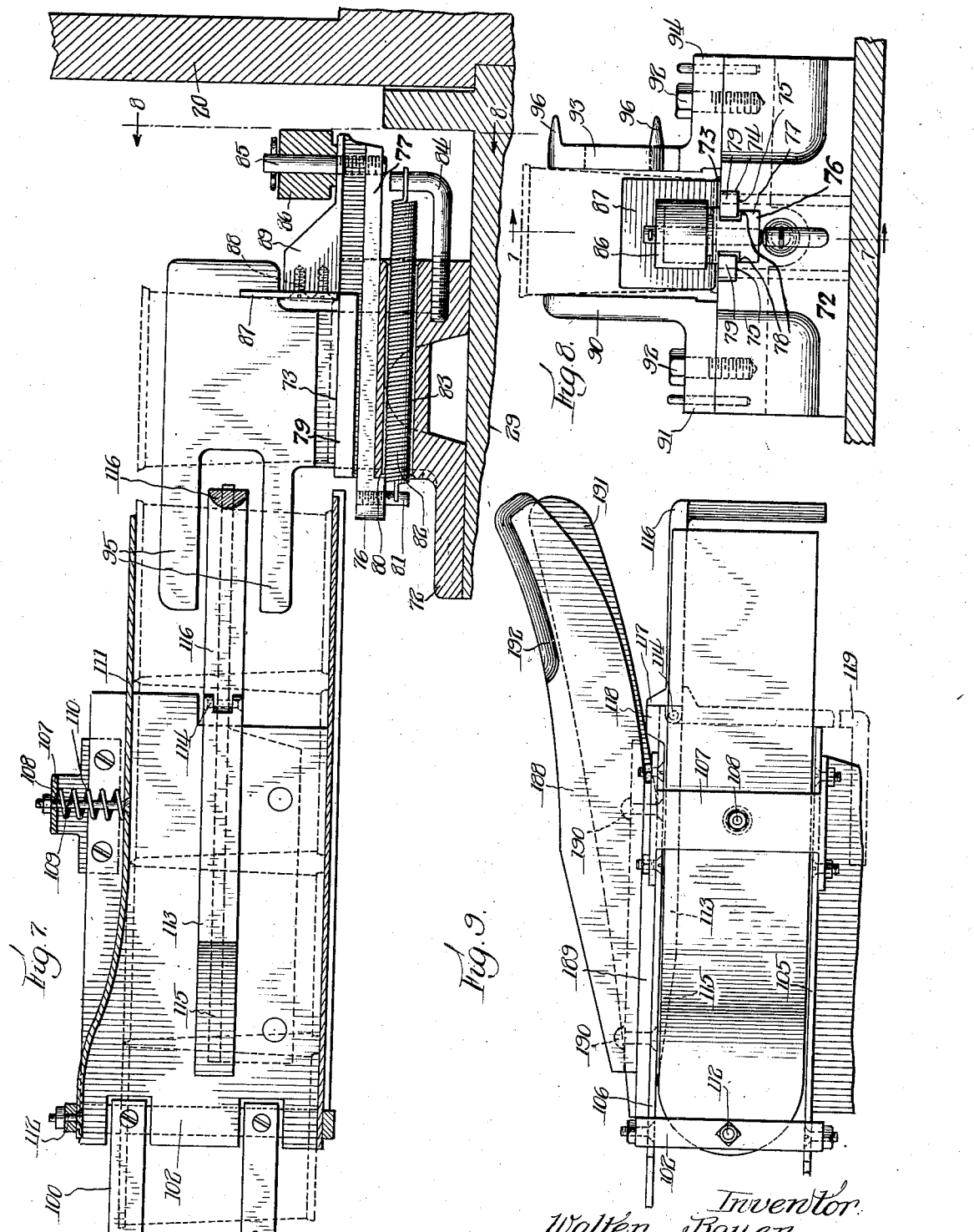

1,860,220

UNITED STATES PATENT OFFICE

WALTER BAUER, OF CHICAGO, ILLINOIS, ASSIGNOR TO LIBBY, McNEILL & LIBBY, OF CHICAGO, ILLINOIS, A CORPORATION OF MAINE

MEAT STUFFING MACHINE

Application filed March 9, 1928. Serial No. 260,292.

This invention relates to can stuffing or filling machines and more particularly to machines employed for filling cans with food substances such as ground meats or other relatively finely divided plastic food materials, of which corned beef hash or similar food products are examples.

This invention has particular reference to the provision for automatic means for feeding predetermined charges of the material to be canned to the machine, feeding cans to the machine and into receiving relationship with each of the can stuffing units of the machine during the continuous movement of said units, means for ejecting the stuffed or completely filled cans from the machine, together with other means operating automatically in the combination of an automatic can stuffing machine and the other mechanisms above referred to.

This invention has particular reference to the provision of additional mechanism for rendering completely automatic in its operation the type of rotary can stuffing machine which comprises a stationary cylindrical frame having cam grooves thereon and about which rotate a plurality of can stuffing units having reciprocating cylinders and nozzles and reciprocating pistons, all operated by the cam grooves on the cylindrical frame in a manner to cause the nozzles to be introduced into cans placed therebeneath and to cause the pistons to be lowered so as to force the material through the nozzles and charge the cans with a predetermined amount of material, the material having been introduced into the cylinders before the pistons are lowered by any suitable method.

This type of machine also embodies in its construction a can receiving and positioning device for each stuffing unit located beneath the cylinder and nozzle so as to present the can when placed therein positively located so as to be held by the nozzle when it descends prior to the can filling operation.

In machines of the above described type, it has been a practice in the past to introduce the cans to be filled on to each can stuffing unit manually at the proper point in the cycle of operation and to further introduce into the cylinder and nozzle of each unit a predetermined weighed charge of material to be canned at a second and predetermined period in the cycle of operation, and lastly, after the cans have been filled by the lowering of the feeding cylinder and piston, and the nozzle has again been lifted by the cam action so as to free the can, to remove the can manually and to leave the can receiving means or socket free to receive a new can, and so on, to repeat the cycle of operation.

The present invention has to do with providing means for combined operation with a machine of the above described type, for accomplishing all of these operations automatically and by means driven in synchronism with the can stuffing machine so as to provide a completely operative combination and a wholly automatic can stuffing or filling machine.

Accordingly, it is one of the objects of the present invention to provide a can stuffing or filling machine which is wholly automatic in its operation.

Another object of this invention is to provide means which are applicable to the rotary type of can stuffing machine above referred to, which will automatically accomplish the feeding of material to the feeding cylinders, the feeding of cans to each unit and the ejecting of the cans and other incidental automatic operations as will hereinafter more fully appear.

It is a further object to provide a novel and automatic feeding device driven in synchronism with all of the other parts of the machine for feeding predetermined charges by volume to each stuffing unit at a predetermined point in the cycle of operation of each unit of the stuffing machine.

It is another object of my invention to provide in a device of the character described in the above stated objects, an automatic means for feeding cans to each of the can stuffing units during the continuous movement of said units.

It is another object to provide in a machine of the above described type means for holding the cans during the filling or stuffing operation, which means is driven in synchronism with means for feeding or introducing cans onto each can stuffing unit and means for discharging the completely filled cans.

It is a further object of my invention to provide a completely automatic machine of the above described type in which driving means are provided for all of the various parts connected from a single source of power in a manner to produce a synchronized operation throughout the entire machine.

A further object of my invention is to provide means for maintaining certain parts of the machine heated whereby solidifying of fats, as when fatty meats are being canned, is prevented, and consequently the danger of clogging the machine by such solidification is eliminated.

It is another object of my invention to provide means of the above described type for preventing cans from being fed to the individual meat stuffing units in the event the previously filled can had not been ejected therefrom, or for any other reason the can receiving and positioning means was not ready to receive a new can.

A further object of my invention is to provide means such as an air blast directed against the can receiving and positioning means for maintaining them clean and free from accumulations of the food stuff, as will be sometimes present, for instance, due to overflow, accidental dropping, or, as in the case where no can had been fed to a particular receiving means to the cylinder discharging a complete charge in the manner as though a can had been in receiving position.

It is a further object of my invention to provide means for conveying the ejected cans away from the point of ejection and for guiding them on to a suitable conveyor belt in the manner to be hereafter described.

These and other objects are accomplished by means of the arrangement disclosed on the accompanying sheets of drawings, in which—

Figure 1 is an elevational view of a completely automatic can stuffing machine constructed in accordance with my invention.

Figure 2 is a plan view of the machine shown in Figure 1.

Figure 3 is an enlarged fragmentary elevational view in cross section, taken through one of the can stuffing units on the line 3—3 of Figure 4 and looking in the direction of the arrows.

Figure 4 is an enlarged fragmentary plan view, partly in cross section, of the machine shown in Figure 1.

Figure 5 is a fragmentary side elevational view showing the upper portion of a meat stuffing machine and the automatic measuring device for the food material to be canned.

Figure 6 is a cross-sectional plan view of the mechanism shown in Figure 5, taken on the line 6—6 of Figure 5 and looking in the direction of the arrows.

Figure 7 is an enlarged elevational view of the can feeding and receiving mechanisms, partly in cross section, taken on the line 7—7 of Figure 8 and looking in the direction of the arrows.

Figure 8 is an end elevational view of the mechanism shown in Figure 7, taken on the line 8—8 of Figure 7 and looking in the direction of the arrows.

Figure 9 is a plan view of the mechanism shown in Figure 7, together with mechanism for preventing the feeding of cans when the can receiving means is not ready to receive a new can.

Figure 10 is an enlarged elevational view partly in cross section of a modified form of filling nozzle contemplated by my invention for filling cans of the sanitary type.

Figure 11 is a plan view, partly in cross section, of the modification shown in Figure 10, and taken on the line 11—11 and looking in the direction of the arrows.

The various novel features of the invention will be apparent from the following description and will be particularly pointed out in the appended claims.

Can construction

My invention contemplates providing a machine of the above described type for filling cans either of the soldered type or of the sanitary type. In order that the present invention will be more readily understood, by the expression "soldered type" of can as used in the present specification, I mean a can having four side walls, a top and bottom, the top of which is provided with a circular or other shaped opening centrally located through which the contents are introduced. When this type of can is employed, the nozzle on the stuffing unit through which the material is fed is preferably of such size and shape as to readily fit within the opening, so that the flanged portion of the top surrounding the opening acts to close that portion of the can which is not occupied by the nozzle itself.

By the expression "sanitary type of can" as used in this specification, I mean the type of can which is opened at its top having only four sides and a bottom. In order to fill this form of can, the modified form of nozzle mechanism shown in Figures 10 and 11 are employed and will be hereinafter more fully described. When this type of can is completely filled, the top is put on by a crimping or other suitable process, as distinguished from soldering a closing disk over the small opening as in the case of the soldered type of can.

Can stuffing machine

By referring to the drawings, it will be noted that the type of machine disclosed as illustrative of my invention embodies a stationary cylindrical frame member 20, mounted on legs 21 and having on its outer surface cam grooves or trackways 22, 23 and 24. The cylindrical frame member 20 is provided with a stepped portion 25 at its upper edge, as shown in Figure 3, and an inverted stepped portion 26 at the bottom thereof. Mounted on the upper step in a manner to rotate thereon is the annulus 27 having the depending flange 28 resting on the step forming a bearing therefor. Corresponding to the upper annulus 27 is the lower annulus 29 having the bearing portion 30 in bearing relation with the step 26. The upper and lower annuluses are tied together by pairs of vertical rods 31 circumferentially disposed about the annulus, any desired number being provided, depending upon the size of the annulus and the number of individual can stuffing units desired for the entire machine. Each pair of rods 31 constitutes the guide rods which serve as a mounting for the reciprocating parts of an individual meat stuffing unit. The annulus 29, as shown in Figure 3, is provided with a depending flange 32 having internal gear teeth 33, through which the stuffing machine is driven. Corresponding to the lower annulus 32 is an upper annulus 34, mounted as an up-standing flange on the annulus 27 and having internal gear teeth 35. Mounted on top of the annular gear 35 is a second annulus 36, fixed to rotate therewith, having gear teeth 37 for driving the mechanism for measuring charges of material to be fed to the machine, all in a manner to be hereinafter more fully described. Attention is directed, however, to the fact that the gear teeth 35 and the gear teeth 36 are of different pitch, inasmuch as they are independent gears and serve for independent purposes, even though they are located one in contact with the other.

The can stuffing machine is driven from a suitable source of power such as for instance power supplied by the belt 38, driven from a line shaft or motor or any other suitable source of power mounted in driving relation with the pulley 39 mounted on the shaft 40. The shaft 40 is carried in the bracket 41 held on the base of the machine and is provided with a worm 41' at one end thereof in mesh with the worm gear 42 carried on the vertical shaft 43. The worm and worm gear are preferably housed by means of the casing 44, as shown in Figure 1, which housing forms bearings for mounting the vertical shaft 43. Fixed with the vertical shaft 43 at the lower end thereof is the gear 45 and at the upper end thereof the gear 46, which mesh with the gears 33 and 35, respectively, of the lower and upper annular members previously described.

From the above described gearing elements it will be obvious that rotation of the shaft 40 through the power belt 38 will impart a rotary movement to the upper and lower annular members on their respective bearing seats carried by the stationary cylindrical frame.

It is further obvious that as the upper and lower annular members rotate the pairs of rods will also rotate. The gearing between the vertical shaft 43 and the upper and lower annulus is such that the upper and lower annuluses have exactly the same angular velocity.

Mounted to slide on each bar of the pairs of guide rods 31 are the parts constituting an individual meat stuffing unit. The structure of an individual unit is more clearly illustrated in Figures 1 and 3 and it will be noted that each unit comprises a feeding or stuffing cylinder 47 having a lip 48 at its upper, outer edge and having a tapered bottom with a hole 49 therein serving as a mounting for the collar 50 and the depending nozzle 51.

Extending laterally from opposite sides of the cylinder 47 are the perforated ears 52 having aligned bearings therethrough in a manner to provide sliding supporting elements maintaining the cylinder on the guide rods 31 for permitting it to reciprocate. Fixed to the cylinder in the rear thereof is the roller 53 attached by a mounting on the stub shaft 54, so that the roller when introduced into the cam groove or trackway 24 and the machine is rotating will cause the cylinder to have a reciprocating movement according to the particular formation of the cam groove or track way. An additional bracket 55 is provided with a second roller 56 adapted to contact the upper flange 57 of the cam groove 24 to aid in moving the feeding cylinder in up and down directions as it rotates about the stationary cylinder frame.

Positioned above the feeding cylinder 47 is a feeding plunger or piston 58 adapted to fit snugly into the cylinder in a manner to eject material contained therein out through the depending nozzle, which plunger or piston is provided with an upstanding stem 59, having a cross head 60, with bearing openings 61 at its ends, forming slide bearings on the pairs of rods 31. The upstanding stem 59 is provided with a stub shaft or trunnion 62 on which is mounted a roller 64, which is in turn mounted in the cam groove or trackway 23.

The piston or plunger 58 and its upstanding stem 59 are centrally bored to provide the aperture 66 in which is positioned the plunger rod 67. Fixed to the upper end of the plunger rod is the traverse arm 68 adapted to slide with the rod, the arm 68 moving up and down in the groove or slot 69 provided therefor in the upstanding stem 59 in a manner to form a guideway. Mounted on the arm 68 is the stub shaft 63 which carries the roller 65 positioned in the cam groove 22.

Carried by the slide bearing members 52 of the feeding cylinder 47 are the vertical bracket members 70 which support the funnel 71. The funnel is so shaped and positioned that its lower reduced end is located inside the lip of the feeding cylinder 47 in a manner to direct material deposited in the funnel into the feeding cylinder and yet not interfere with the travel of the plunger or piston 58.

Attention is directed to the configuration of the three cam grooves 22, 23 and 24 and their disposition on the stationary cylindrical frame relative to each other. The lower groove 24 effects the reciprocation of the feeding cylinder 47, the cam groove 23 effects the reciprocation of the ejecting plunger 58, and the upper groove 22 causes the desired movement of the inner ejecting plunger 67. Attention is further directed to the fact that the inner plunger 67 is adapted to fit the interior of the depending nozzle 51 located at the bottom of the feeding cylinder 47. The lower cam groove 24 is of such a shape that the feeding cylinder 47 will be raised and lowered in timed relation to the introduction and removal of cans on and off of the machine respectively. The left-hand portion of the groove 24 as shown in Figure 1 is horizontal in a manner to provide a dwell in the movement of the feeding cylinder in its extreme lower position so as to maintain the feeding nozzle projecting inside of the cans during the filling operation. The point in the circumference of the machine where the cam groove 24 commences to rise is that point where the complete filling action has been accomplished, and the nozzle is lifted out and is completely free of the can in time to permit the can being ejected from the machine. The cam groove 23 is so constructed as to effect the proper movement of the plunger whereby it is lowered into the feeding cylinder to eject the contents thereof only after the feeding cylinder and nozzle are in proper inserted position relative to the can, attention being directed to Figure 1 where it will be noted that the plunger commences to rise at substantially the same point in circumference at the point where the feeding cylinder commences to rise.

The cam groove 22 which controls the inner plunger 67 is constructed to cause the inner plunger to continue on its downward movement, even after the plunger and the cylinder commence to rise. This causes the feeding nozzle 51 to be completely cleared of the material contained therein whereby a complete discharge of the material contained in the feeding cylinder and nozzle is effected.

During the outward movement of the nozzle 51 after the can has been filled, the nozzle is filled with the end of the inner plunger in a manner to form a solid cylinder occupying a substantial volume of the can, all of which causes the material to be placed under abnormal compression, but immediately upon the withdrawal of the tube and plunger the material is permitted to collapse inwardly and fill the space vacated by the retroacted nozzle. This abnormal compression causes the material to be fed to the remote corners of the can and prevents air spaces and the like from being formed in the can.

The lower annular member 29 constitutes a table on which are mounted a plurality of can receiving and positioning devices, one beneath each of the can stuffing units above described, each device being so positioned and constructed as to locate and maintain a can in proper position to present the can opening in alignment with the filling nozzle 51 so that the nozzle is introduced thereinto upon the filling cylinder being lowered under the operation of the machine.

The machine thus far described in detail constitutes a filling machine which is old and known in the art and one which considered apart constitutes no part of the present invention. The further details hereinafter described, which render the above described machine completely automatic in operation, considered singly and in combination with the above described machine, constitute the novelty in the present invention.

*Can receiving and positioning means*

The can positioning means as contemplated in my invention, is adapted to cooperate with other mechanisms whereby they are wholly automatic in receiving and ejecting cans from the machine.

Referring now particularly to Figure 7, it will be noted that my device contemplates a can positioning device comprising a pedestal 72 having a top surface 73 on which the cans are adapted to rest and the elevation of which is determined with relation to the extreme lower positions of the reciprocating parts of the stuffing units. The upper surface 73 of the pedestal is provided with a stepped slot or groove 74 having the shoulders 75 as shown in Figure 8. This groove forms a guide slot for the reciprocating carriage 76 which has an inverted T-shaped head 77 presenting the shoulders 78 fitting in the slot 74. Plates 79 are positioned on the shoulders 75 and are held by suitable screws in a manner to maintain the carriage 76 in sliding engagement in the pedestal. The carriage is provided with a shoulder 80 at one end thereof adapted to engage a portion of the pedestal to limit the movement of the carriage in the inward direction, the carriage being further provided with a pin 81 which forms a mounting for the coil spring 82 located in the opening 83 of the pedestal. At the opposite end of the pedestal is the hook projection 84 rigidly mounted in the pedestal as shown and forming a stationary support for the opposite end of the spring 82. Inasmuch as the spring 82 is a tension spring, it is obvious that it will maintain under normal conditions the carriage in the extreme inward position, with the shoulder 80 in abutment with the pedestal.

At the inner end of the carriage there is an upstanding pin 85, which is screwed or otherwise mounted in the carriage and which forms a bearing for the roller 86 provided to contact a cam guide in a manner and for a purpose hereinafter more fully described. The carriage is further provided with a vertically disposed back plate 87 held by screws or rivets 88 against the upstanding portion 89 of the carriage. This plate is so disposed and constructed as to form a back stop for the cans when they are introduced into the device so as to limit their inward movement and to position them in a proper manner relative to the feeding nozzle located thereabove. It will be obvious that if the roller 86 is caused to contact a cam for forcing it in the outward direction that the carriage will be free to slide with the back plate 87 in a manner to eject the cans from the pedestal on which they are carried. The side walls of the device are constructed preferably as shown in Figure 8, i. e., L-shaped, having vertical wall portions and a base portion by which they are mounted. One plate comprises the vertical wall 90 and the base plate 91 held by means of suitable screws or other holding means 92. The opposite side wall comprises the vertical wall 93 and the base portion 94 held by suitable screws 92 and being further provided with the extensions 95 and at the top and bottom with lateral reinforcing ribs 96 therefor. Attention is directed to the fact that the extensions 95 form fingers which enter into the feeding and ejecting operations and that the wall element having fingers 95 is located on the trailing side of the device with respect to the direction of rotation.

*Can feeding mechanism*

The can feeding mechanism may be of any suitable construction, but it is preferably in the form of an elongated frame or cage element 97, which contains in a continuous column a plurality of cans fed as by gravity from a hopper or other means located above the level of the machine.

For the purpose of this invention the cage element 97 is in the nature of a conveyor chute for guiding the cans as shown in Figures 3 and 4, for instance, into position to be fed on to the machine. The cage 97 comprises upper and lower straps 98 and 99 and side straps 100 constituting the enclosing means for the cans and circumferential straps 101 riveted or attached in any other suitable manner to the strap elements in spaced relation. A major portion of the cage or conveyor 97 is disposed in a vertical position so that the cans will be fed automatically by means of gravity alone.

At a point in close proximity to the can stuffing machine where the cans are taken on, the straps 100 terminate as shown in Figure 7 and are supported by a traverse strap 102. Mounted on a rigid bracket 103 carried by a portion of the frame is a table or platform 104 for supporting the lower end of the cage and means for feeding the cans onto the machine. The strap elements 99 of the cage terminate at a point substantially flush with the top of the table 104 so that the cans will be fed readily in their course of travel on to the top of the table. Positioned on top of the table are side walls 105 and 106 which form with the table 104 a box-like construction for containing the cans at the extremity at which they are fed on to the machine. Across the top of the side walls is a strap 107 which is perforated as at 108 for receiving the bolt 109 on which the spring 110 is mounted in bearing against the top plate 111 mounted as by means of the nut and bolt 112 to the upper portion of the traverse strap 102 previously referred to. This plate is preferably of flexible spring metal and is adapted to bear frictionally on top of the cans to offer a frictional resistance to their travel so that they will be readily maintained in proper position. Located on the inner surface of the side plate 106, about midway its height, is the horizontal bar 113 having a pivot 114 at one end and a taper 115 at its opposite end. The taper is for the purpose of guiding the cans laterally so they will more snugly fit the space provided for them, the space in the cage being slightly in excess of that which is necessary. Mounted on the pivot 114 is the L-shaped arm 116 extending across the opening of the cage in a manner to arrest the forward movement of cans under the feeding action of gravity. A lug 117 is provided on the L-shaped arm adjacent the pivot and adapted to abut a lug 118, carried on the bar 113 in a manner to prevent excessive pivotal movement in a counter-clockwise direction, such as that shown in Figure 9. This arrangement, however, permits the L-shaped arm 116, under certain circumstances to be hereinafter described, to move to the dotted line position, shown at 119 in Figure 9, in which position the bar prevents the passage of any cans from the open end of the box-like cage. By referring to Figure 7 it will be noted that the position of the bar 113 and the L-shaped extension 116 is such that it interfits with the extensions or fingers 95 on the can receiving mechanism so that the fingers upon movement will withdraw a can from the feeding device laterally in a manner to cause it to be subsequently fed into the can receiving device.

By referring to Figure 4, it will be noted that a pin 120 is mounted on the table 104 and forms a bearing for the elongated curved arm 121, which arm is guided by means of the strap 122 properly located on the plate 104, and is resiliently mounted by means of the extension 123 thereon penetrating the lug 124 and the spring 125, all in the manner shown. The elongated arm is adapted to form a cam surface against which the circumferentially moving cans under the influence of fingers 95 will abut and will be caused thereby to move radially inwardly into their proper positions during their rotary movement. The spring 125 offers a resilient backing to prevent damage to the parts under unusual conditions.

Material charge measuring device

The mechanism for feeding predetermined charges of material into the funnels is best illustrated in Figures 5 and 6. The annular gear element 36 mounted to rotate at the upper part of the machine previously described serves as a means for driving the measuring mechanism. By referring to Figure 5 it will be noted that a lug 126 is mounted on the upper part of the cylindrical frame member and serves as a mounting for the stub bearing 127 held against rotation by means of the set screw 128. Mounted on the bearing is a gear 129 in mesh with the annular 36, which gear is provided with an extension 130 provided with a slot 131 constituting an adjustable mounting for the pitman bearing 132. Mounted on the bearing is the pitman 133, having a forked end 134 constituting a pivot with the bearing 135 for the rod 136. The rod 136 is screw threaded as at 137 on to the block 138, as shown in Figure 6 and held by means of the nut 139 against accidental displacement. Screwed into the side of the block 138 are pivot bolts 140 and 141, forming mountings for the rods 142 and 143, which are held thereon by nuts 144 and 145. These rods are screw threaded as at 146 and 147 to adjustably receive the screw threaded heads of the bolts 148 and 149 which have threaded shanks 150 and 151 screwed into the screw threaded opening 152 of the block 153. It will be obvious that this arrangement permits the blocks to be adjusted toward and away from each other so as to vary the opening A shown in Figure 5. The two blocks with their opposed faces are mounted to slide in a casing element 154, having a bottom and two sides, the bottom being provided with an opening 155 surrounded by the depending flange 156. Mounted on top of the housing is a closing plate 157 having an opening 158 and the upstanding flange 159. One portion of the flange 159 has a bearing lug 160 thereon and an additional lug 161 is mounted in spaced relation thereto on the end of the closing plate 157. This last lug has a screw threaded opening therethrough in a manner to receive the rod 162 having a handle 163 adapted to be engaged for manual adjustment. The inner end of the rod is provided with an annular groove 164, in a manner to form a swivel connection with the adjusting plate 165, which is slidably mounted, as shown in Figure 5, to adjust the opening B, as shown. The plate 165 has a depending flange 166, through which a portion of the rod 162 extends. It will be obvious that by turning the hand wheel 163 the opening B may be readily adjusted. It is further obvious that when the machine rotates in its operation that the gear 129 is accordingly rotated by the gear 36 in a manner to reciprocate the blocks 138 and 153, so as to bring the opening A successively under the opening B and over the opening 155. It will also be obvious that if the material to be canned is fed into the opening B and thence into the opening A it will be moved laterally and ejected through the opening 155 in measured charges.

It will also be noted by referring to Figure 5, that in addition to the adjustment effected by varying the size of the opening A and the size of the cooperating opening B, an additional adjustment may be effected by altering the position of the bolt 132 in the slot 130, whereby to bring the bearing for the pitman 133 toward or away from the center of rotation of the stub bearing 127. This adjustment operates to alter the stroke and consequently the travel of the blocks whereby a variable feeding action is provided. Furthermore, by adjusting the rod 136 with respect to the block 138 by means of threads 137, the initial position of the pair of blocks may be determined for altering the timing of the feeding action. By means of the pitman adjustment in the slot 130 and the last mentioned adjustment of the rod 136, it is obvious that the feeding action may be delayed or hastened with respect to the synchronized action of the remaining portions of the machine, whereby the material may be caused to feed into the funnels at the desired moment to give the most efficient results.

By referring to Figures 1 and 2 it will be noted that the pan or receptacle 167 is positioned above the machine and has an opening 168 therein, which overlies the adjustable opening B, so that material located in the pan can be readily fed into the opening in a manner to effect the automatic feeding. The pan 167 may be fed from a suitable pipe 169, shown in Figure 1, from any suitable source, as a hopper located above. In practice it will perhaps be preferable to have an operator stand adjacent the machine and work the material toward and into the opening 168 and thence into the opening B. It will also be noted in Figure 1 that the opening 155 leads to the downwardly extending chute 170, which terminates immediately above the path of the funnels 71, previously described, in a manner to feed the measured material thereinto as they pass in their path of travel.

Machine heating feature

This invention contemplates in addition as shown in Figure 1, a suitable heating unit, such as the burner 171, having a plurality of jets 172 fed by a fuel pipe 173 connected to a suitable source of fuel not shown. The burner is so disposed that the flames therefrom will play upon the sides of the funnels as they pass so as to keep them heated sufficiently to melt any tallow or fatty substances which are passing through the machine, all to prevent clogging, due to solidification of the fats. When such substances are heated and melted the parts are kept well lubricated, which makes for efficiency in operation.

Can ejecting mechanism

During the rotation of the can stuffing machine the cans are completely filled and at a point in the circumference of the machine slightly in advance of the point of ejectment, the cylinder 47 and nozzle 51 of each can stuffing unit are raised by the influence of the cam groove 24 in a manner to withdraw the nozzle completely from the can. During this portion of the circumferential travel the outer and inner edges of the can are caused to pass under the plate 174 on the inside of the path traversed by the upstanding pairs of rods 31, and plate 175 located on the outside of such path, leaving a space between their adjacent edges sufficient to permit the rods to pass through and also the nozzle 51 when it is being removed from the inside of the can. These plates are held by any suitable supports, such as the bracket 176 mounted against the inner cylindrical frame member 20 and the supports 177 mounted on an outside stationary part of the frame.

Mounted on the inner stationary cylindrical frame member 20, at a point in the circumference thereof where it is desired to eject the cans, a triangular cam member 178 is provided in the same horizontal plane as the roller 86 at the inner end of the sliding carriage 76 of the can receiving devices. At the outer portion of the device is a platform 179, with its inner edge positioned in a manner to come in close association with the upper surface of the sliding carriage of the can receiving devices so as to form a surface on to which the cans can be slid when removed from their filling position. A rotating disk 180 is provided mounted on the shaft 181, with its upper surface only slightly below the surface of the platform 179. The piece constituting the platform is very thin whereby it may overlap a portion of the rotating disk and yet permit the cans to be slid from the platform on to the disk with the necessity of dropping off only a very slight step. Arranged tangentially at a point diametrically on the disk 180 is a flexible conveyor element 182 which may be of any general construction, but of sufficient width to accommodate the cans as they are fed thereon from the rotating disk. The disk is likewise very thin and is disposed in overlapping relation to the container, and forms a comparatively small step therewith so that the cans under the influence of the rotating disk and a travelling conveyor will be caused to pass from one to the other without difficulty. The disk is constructed and connected to be rotated in a clockwise direction, as indicated by the arrow and the cans are caused to travel in the proper path by means of the guiding rails 183 and 184 mounted as by means of small feet 185 attached on a suitable support therefor. It will be noted that the rails are bent in a manner to guide the cans in a circumferential path of the disk and to cause them to travel tangentially therefrom on to the conveyor 182. Attention is directed to the fact that the rail 183 terminates at 186 and is supported by a foot piece 187 mounted on an arcuate guide bar 188, which is attached to the side plate 106 of the can feeding box member. This piece is provided with an upstanding flange 189 attached as by means of rivets 190, as shown in Figure 9. Located below this guide plate is a second guide plate 191 attached in a similar manner to the side plate 106, the edge of which, however, underlies slightly the edge of the upper plate 188. These plates acting together form a guide means for directing the cans when they are moved thereagainst under the influence of the rotating disk 180 circumferentially around the disk and on the conveyor 182. Attention is directed, however, to the fact that the guide plate 188 at its end is provided with a knife edge 192, for a purpose to be hereinafter described.

If, under any circumstances, it should occur that a can is not properly ejected, or becomes wedged or otherwise fails to move free of its particular can receiving and positioning means, and it is caused to continue in a circumferential path by movement of the fingers 95 instead of being deposited freely onto the rotating disk, such a condition will not damage or destroy the guide bar 188 in that the knife edge will freely penetrate the can by cutting its way therethrough and permit it to pass by the bar without difficulty. When a can is not ejected and passes the bar in this manner, it contacts the L-bar 116 shown in Figure 9 and causes it to move on its pivot 114 to the dotted line position 119 in a manner above referred to, so that the feeding of cans to the particular can receiving means which contains the jammed can is prevented, but the feeding means is immediately restored after such can receiving means has passed to its normal condition, so as to feed cans to the other receiving means in the manner desired.

It will be obvious from this construction that the guide bars 188 and 191 constitute means for directing the cans circumferentially with the disk and yet offer no obstruction to the passing of the can in the event one is jammed or wedged in the can receiving device.

The upper surface of the guide bar 191 extends only slightly above the upper surface of the disk 180 so that under ordinary conditions it will operate as a guide bar for the projecting lower flange of the cam, but under unusual conditions will present only a slight step over which the can can be readily forced.

For driving the rotating disk 180 a gear 193 is provided on the shaft 43, which meshes with a chain or other flexible gear element 194, driving the sprocket 195. The sprocket 195 is mounted on a shaft 196 carried in a bearing 197 in the bracket 198, riveted or otherwise rigidly attached to a leg 21 of the supporting frame structure. Rigidly fixed with the shaft 196 is the gear 199 which meshes with a second gear 200, also carried by the bracket 198. Gear 200 is fixed to shaft 201, to which is also fixed a sprocket 202. The sprocket 202 is connected to sprocket 203 carried on the shaft 181 by means of the chain or other flexible gearing element 204.

The conveyor element 182 may be driven by gears or any other suitable connection from the shaft 181 in the manner desired, or it may be driven from a separate source of power, according to the particular installation.

Air cleaning means

A pipe 205 is provided extending from the top of the device into the interior of the stationary cylindrical frame member 20, and extending through the wall thereof as at 206, with its end 207 presented in close proximity to the path of the cam receiving and positioning device. This pipe is connected with a source of air under pressure, not shown, in a manner to provide a constant stream of air flowing from the end of the pipe 207 for blowing out and cleaning the can receiving devices or pockets just prior to the introduction of new cans therein. In the event that, through some failure of the machine, or failure of the supply of cans, a particular can receiving device or pocket did not contain a can for a particular cycle of the machine, the pocket would be filled with the material to be canned under the action of the can stuffing unit, which would, of course, prevent the introduction of a new can into the pocket unless means were provided for cleaning out this material. The supply of air under pressure ejected from the end of the pipe operates to maintain the pockets clear at all times. It also aids in clearing away any excess material which accidentally spills or otherwise falls upon the parts of the machine. Provided around the bottom of the machine is an annular pan 208 for catching such material as may drop or otherwise fall from the machine during the operation.

Modification for sanitary cans

Referring particularly to Figures 10 and 11, the modified form of my invention embodies a nozzle 210, which is shown as square, but will serve equally as well if it is of any other non-circular shape. Mounted on the nozzle is the sliding collar 211 having a shoulder 212 thereon, and the depending flange 213. A screw 214 is provided at one side thereof with its end positioned in the slot 215 of the nozzle 210. This modified form of stuffing nozzle is intended for operation on open topped cans 216, herein termed "sanitary cans", wherein the collar 211 operates to form a partial closing means for the upper portion of the can during the filling operation. The collar is slidably mounted on the nozzle 210 and when the screw is in the lower portion of the groove 215 the collar is caused to be lifted with the lifting of the nozzle to move the entire device from engagement with the can. When the nozzle is being lowered the collar abuts the margin or upper end of the can and is arrested in such position, but due to the slot 215 the nozzle is free to continue its downward movement in a manner exactly similar to that of entering the round opening in the top of the soldered cans previously described. In addition to forming a partial closing means the sliding collar 211 also forms a supporting or bracing frame for the upper margin of the can and prevents distortion thereof by the pressure of the stuffing operation.

Operation

In operation the machine rotates in a counter-clockwise direction, as seen in Figure 2 and indicated by the arrow. The material to be canned is fed into the receptacle 176 through the pipe 169 and with the aid of an operator is introduced through the opening 168 into the automatic measuring device for measuring out predetermined charges by volume. The measuring device is reciprocated by means of the pitman 133 driven from the gear 36 at the top of the rotating machine so that the feeding action will be in synchronism with the passing of the individual meat stuffing units beneath the end of the chute 170. Consequently, as the funnel 71 of each meat stuffing unit passes beneath the lower end of the chute 170 it receives a predetermined charge of the material to be canned. At the point just ahead of the point in the circumference of travel of each unit of the machine at which the charge is received, an empty can 217 is introduced by means of the fingers 95 of the can receiving device contacting laterally the face of a can projecting from the feeding mechanism, which can is guided by means of the bar 121 into proper position beneath the nozzle 51. At this instant the stuffing cylinder 47 and nozzle 51 are lowered into the opening of the can and the plunger 58 and rod 67 are caused to move successively downwardly in a manner to eject the charge of material into the can. At the point where the feeding cylinder 47 and nozzle begin to move upwardly the edges of the can pass beneath the plates 174 and 175 to prevent the lifting thereof with the nozzle and as the can receiving device approaches the cam 178 the roller 86 contacts the edge thereof and ejects the can on to the platform 179. During the ejecting operation the can is caused to move by engagement with the fingers 95 until it is dropped on to the rotating disk 180 entirely free of the can receiving device. At this point the rotating disk carries the can in a circumferential path until it contacts the guide bars 188 and 191 and also the guide rail 183 and deposits it upon the travelling conveyor 182. The conveyor carries the can on to any desired point where it is further processed and sealed as desired.

As above explained, in the event the cans are jammed instead of being properly ejected, the can will pass by the guide bar 188 by virtue of being cut by the knife blade 192 on the end thereof and cause, by its presence, the L-bar to move to the dotted line position 119 shown in Figure 9, to prevent the feeding of a new can at that time. The pipe 205 will maintain the parts clean and free of excess material during operation, and the flame from the burner 172 will maintain the funnels and portions of the machine, which are apt to be clogged, hot so as to prevent solidification of the fats in the food material.

I claim:

1. In a device of the character described the combination of a movable frame carrying a plurality of stuffing units, said units moving in a predetermined path, and a stationary measuring device having an outlet above the path of said units, means deriving reciprocating motion in driving connection with said movable frame and connected to said measuring device, said measuring device being adjustable to vary the charge fed to each unit, and said means being adjustable to vary the time at which the measured charges are fed to said units.

2. In a device of the character described, the combination of a movable frame carrying a plurality of stuffing units travelling in an endless path, each unit reciprocating during each cycle of travel, a stationary measuring device having an outlet overlying said path of said units, and means deriving reciprocating motion in driving connection with said movable frame and connected to said measuring device, said measuring device being adjustable to vary the charge fed to each unit, and said means being adjustable to vary the time at which the measured charges are fed to said units.

3. In a device of the character described, the combination of a rotatable stuffing machine having a gear fixed thereto, and a measuring and feeding device comprising a hopper and a reciprocating measuring plunger, said plunger being adjustable to vary the charge, and a gear in mesh with said first gear having a pitman connected thereto for reciprocating said plunger, and capable of adjustment to vary the stroke of said plunger.

4. In a can stuffing machine a can stuffing unit movable in a predetermined path, means for automatically feeding cans to said unit during the movement of the latter, and means for preventing the feeding of said cans to said unit if said unit is not free to receive said cans.

5. In a can stuffing machine a can stuffing unit movable in a predetermined path, means for automatically feeding cans to said unit during the movement of the latter comprising a frame for retaining and feeding cans by gravity, said chute being provided with a pivotal arm at the end thereof for arresting feeding movement of the cans, said arm being movable to a position free from said unit when said unit is not free to receive an empty can, and in said position adapted to arrest the feeding of cans until said unit has passed.

6. In a can stuffing machine, can stuffing units movable in a predetermined path, means for automatically discharging cans from said units comprising conveyor means and a stationary guiding arm adapted to contact and influence the movement of said cans, said arm being provided with a knife edge adapted to penetrate said can in the event of partial removal from said units.

Signed at Chicago, Illinois, this 28th day of February, 1928.

WALTER BAUER.